UNITED STATES PATENT OFFICE.

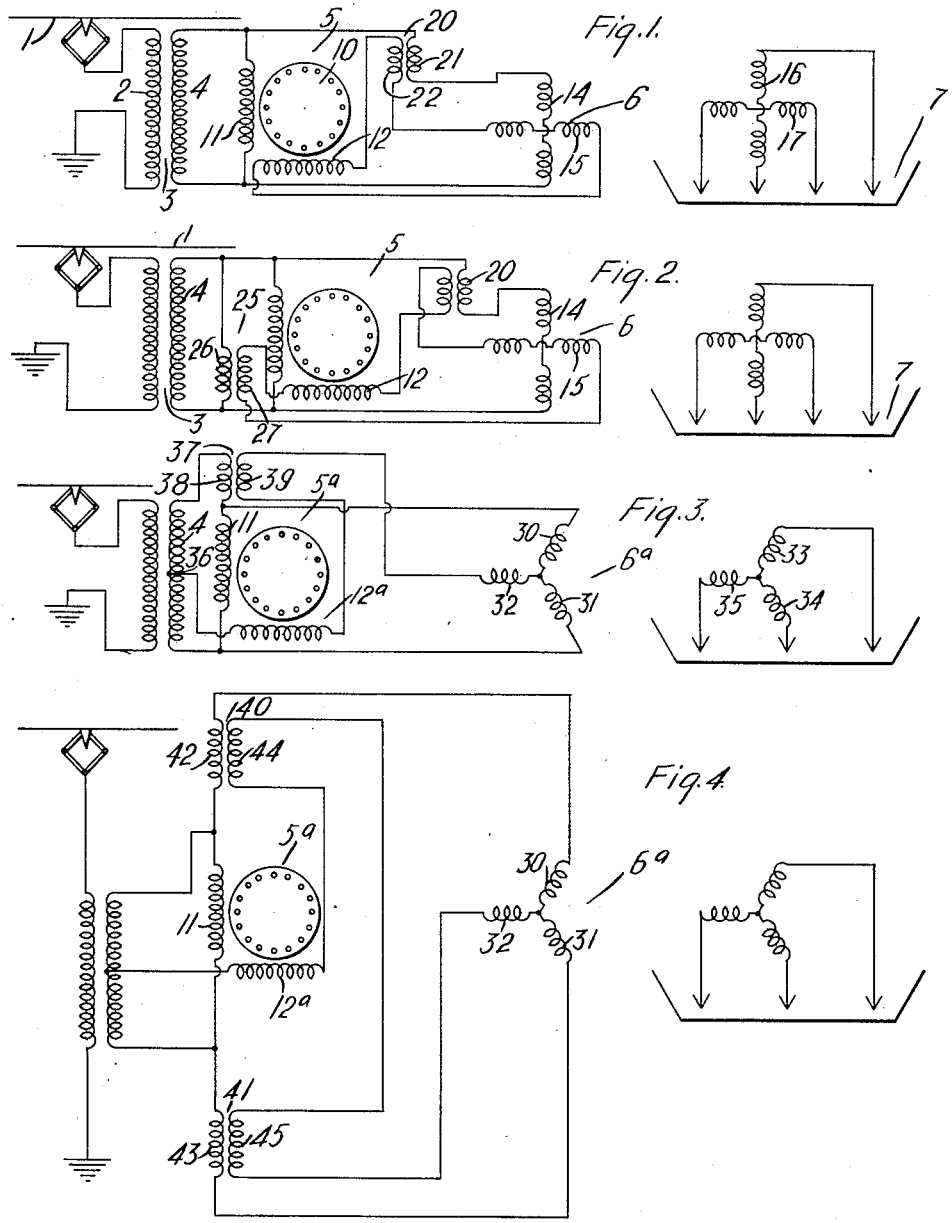

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,242,937. Specification of Letters Patent. Patented Oct. 16, 1917.

Application filed May 25, 1914. Serial No. 840,715.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to the regulation of phase converters that are employed for converting single-phase alternating current energy into polyphase energy for supplying polyphase dynamo-electric machines.

One of the objects of my invention is to provide simple and effective means for automatically compensating for the inherent phase distortion and voltage reduction of a phase converter under load, whereby substantially balanced load conditions shall be maintained at all times.

It is well-known in the art that, when a phase converter, such as is referred to above, is subjected to load, there is a reactive and ohmic drop in its windings which results in a displacement in phase position of the voltage of said converter in the one direction or the other, according to whether the motor is acting as a motor or as a generator, and, moreover, this phase distortion or displacement is accompanied by a decrease in the converter voltage.

According to my present invention, I propose to accomplish the desired regulation of the phase converter by means of a transformer or transformers which are suitably connected in circuit to perform the desired functions.

In the accompanying drawing, Figure 1 is a diagrammatic view of a system embodying my invention, and Figs. 2, 3 and 4 are similar views of systems embodying modifications of my invention.

Referring particularly to Fig. 1 of the drawing, a supply circuit conductor 1 is adapted to deliver single-phase alternating current energy to a primary winding 2 of a transformer 3, said winding being connected to a return circuit conductor or ground, and the transformer 3 is provided with a secondary winding 4 which delivers energy to a phase converter 5 and a polyphase dynamo-electric machine 6, the speed of which is controlled by a liquid rheostat 7 or other suitable resistance device.

The phase converter 5 preferably comprises a squirrel cage rotor 10 and a plurality of windings 11 and 12 which are electrically independent and electro-magnetically disposed in quadrature, the one with the other. The winding 11 is the exciting winding of the converter 5 and is connected across the transformer winding 4 and excited in phase therewith, while the secondary winding 12 by reason of its relationship to the winding 11 and the rotor 10, has induced therein a voltage substantially in quadrature with the voltage of the transformer 3.

The dynamo-electric machine 6 comprises primary windings 14 and 15 and secondary windings 16 and 17, which windings are also disposed in 90° relation, as is customary in two-phase induction motors. The primary winding 14 is connected across the transformer winding 4 and exciting winding 11 of the converter 5 and is excited in phase therewith, while the other primary winding 15 of the motor 6 is connected in a local closed circuit which includes the converter secondary winding 12. Thus, the polyphase dynamo-electric machine 6 is supplied with two-phase energy from a single-phase source.

In order to effect compensations for the phase distortion and voltage reduction hereinbefore referred to, I employ an auxiliary transformer 20 having a primary winding 21 and a secondary winding 22. The primary transformer winding 21 is connected in series with the dynamo-electric machine winding 14 across the transformer winding 4 and is traversed by the load current of the machine 6, while the secondary winding 22 is connected in the local closed circuit including the converter secondary winding 12 and the winding 15 of the machine 6. It is evident, therefore, that, as the load current upon the machine 6 varies, the excitation of the primary winding 21 of the transformer 20 is accordingly influenced and, therefore, a correspondingly variable out-of-phase voltage is introduced into the secondary closed circuit, which automatically tends to maintain substantially balanced conditions and to correct for the distortion and voltage reduction of the phase converter under load conditions.

Referring now to Fig. 2, I have provided another auxiliary transformer 25, in addition to transformer 20, for effecting the desired regulation, and said transformer 25 embodies a primary winding 26 that is connected across the transformer winding 4 and a secondary winding 27 that is also connected in the local closed circuit of the converter secondary winding 12 and the winding 15 of the dynamo-electric machine 6. When these connections are employed, a constant correcting component of voltage is introduced into the secondary closed circuit by means of the shunt transformer 25, and a variable correcting voltage is supplied through the agency of the series transformer 20. The resulting compensations may, in certain instances, be found more desirable than in cases where only a single series transformer is depended upon for regulation.

Reference may now be had to Fig. 3 in which a three-phase dynamo-electric machine 6a having primary windings 30, 31 and 32 and secondary windings 33, 34 and 35 receives energy from a phase converter 5a, the secondary winding 12a of which is connected to substantially the mid-point 36 of the transformer winding 4. The converter exciting winding 11 is connected across the transformer winding 4, and the secondary winding 12 is designed to produce a voltage therein which is substantially 86.6% of the transformer secondary voltage, whereby balanced three-phase voltages are supplied to the primary windings 30, 31 and 32 of the machine 6a by reason of the Scott or T connection employed, as will be readily understood.

In order to effect the desired regulation under load conditions, I employ an auxiliary series transformer 37 having its primary winding 38 connected between the converter winding 11 and the transformer winding 4, and which is traversed by the motor load current, while its secondary winding 39 is included in circuit with the converter secondary winding 12a and the winding 32 of the machine 6a. Thus, a correcting out-of-phase voltage is impressed upon the secondary circuit which includes the secondary converter winding 12a and the winding 32 of the dynamo-electric machine 6a. Since the transformer primary winding 38 is traversed by the motor load current, the correcting voltage varies in accordance with the motor load, and, hence, maintains substantially balanced conditions at all times.

In Fig. 4, I have shown a modification of the system set forth in connection with Fig. 3, in that a plurality of auxiliary transformers 40 and 41 are used, the primary windings 42 and 43 being respectively connected between the converter exciting winding 11 and the respective primary windings 30 and 31 of the machine 6a. The transformers 40 and 41 are also provided with secondary windings 44 and 45 which are connected in series with the converter secondary winding 12a and the machine winding 32. With this arrangement of auxiliary transformers, unbalancing in the phase windings 30 and 31 of the machine 6a is precluded, while the desired automatic regulation of the phase converter 5a is effectively accomplished.

In my copending application, Serial No. 819,739, filed February 19, 1914, I claim broadly the provision of means for producing an inductive relationship between the output branches of a phase-converter system in order to promote balancing between the different phases, and the claims in this application are restricted in view of the broad claims in said copending application.

I do not wish to be restricted to the specific arrangement of apparatus and circuit connections herein shown and described, and I desire that only such limitations shall be imposed as are indicated in the appended claims.

I claim as my invention:

1. In a system of control, the combination with a source of energy, a phase converter and a polyphase dynamo-electric machine adapted to receive energy from said phase converter, of a series transformer having windings connected in circuit with the different phase windings of said dynamo-electric machine.

2. In a system of control, the combination with a source of energy, a phase converter and a polyphase dynamo-electric machine adapted to receive energy from said phase converter, of a transformer having one winding inserted between one of the converter windings and one of the dynamo-electric machine windings and another winding connected in series with the other converter winding and dynamo-electric machine winding.

3. The combination with a source of energy, a phase converter having a plurality of windings and a polyphase dynamo-electric machine, of an auxiliary transformer having a plurality of windings one of which is connected in series with one of said dynamo-electric machine windings and the other of which is connected in a series circuit with one of said converter windings and another dynamo-electric machine winding.

4. The combination with a source of energy, a polyphase motor, and a phase converter having one winding connected to said source and another winding connected in series circuit with a winding of said motor, of a series transformer having one winding connected in series with another motor winding across said source and its other winding connected in series with the first converter winding and first motor winding, whereby the converter phase distortion and voltage reduction is automatically compensated under load conditions of said motor.

5. The combination with a phase converter and an electric motor each having a plurality of phase windings, and a source of energy connected across one of the motor windings and one of the converter windings, of a plurality of auxiliary transformers having primary windings respectively connected across said source and in series between said motor winding and said converter winding, and secondary windings connected in series circuit with another of said motor windings and said converter windings.

6. The combination with a phase-converter and an electric motor, each having a plurality of phase windings, and a source of energy connected across one of the motor windings and one of the converter windings, of means for providing a closed circuit including other phase windings of said converter and of said motor, means for interposing a substantially constant voltage in said closed circuit which is out-of-phase with the voltage impressed thereupon by said phase-converter, and means for interposing in said closed circuit a variable voltage which is out of phase with said converter voltage.

7. The combination with a source of energy, a phase converter connected thereto and a polyphase electric motor adapted to receive energy from said source and said phase converter, of a transformer dependent for excitation upon load conditions of said motor for correcting the phase distortion of said converter.

8. The combination with a phase-converter and an electric motor, each having a plurality of phase-windings, and a source of energy connected across one of the motor windings and one of the converter windings, of means for providing a closed circuit including other phase windings of said converter and of said motor, means for interposing a substantially constant voltage in said closed circuit which is out of phase with the voltage impressed thereupon by said phase converter, and means for interposing in said closed circuit a voltage which varies in substantial accordance with the load current of said motor and which is out of phase with said converter voltage.

9. The combination with a phase-converter and an electric motor, each having a plurality of phase windings, and a source of energy connected across one of the motor windings and one of the converter windings, of means for providing a closed circuit including other phase windings of said converter and of said motor, and means for interposing a voltage variable in substantial accordance with the load current on said motor in said closed circuit which is out of phase with the voltage impressed thereupon by said phase converter.

10. A balanced phase converter system comprising a phase converter, a circuit for supplying current of one phase to the converter, a circuit for delivering current of a different phase to the load, one of the circuits comprising three or more branches, and a mutual reactance associated with a plurality of the branches for balancing the voltages between the branches.

11. A balanced phase converter system comprising a single phase circuit, a three-phase circuit, means between the circuits for converting current of the one phase into current of the other phase, and a mutual reactance magnetically interconnecting a plurality of the branches of the three-phase circuit for balancing the voltages between the branches throughout variations in load.

12. A balanced phase converter system comprising a single-phase circuit, a three-phase circuit, a rotary phase converter connected to the three-phase circuit, a transformer having one winding connected to the single-phase circuit and one winding connected to the converter, and mutually inductive coils connected in branches of the three-phase circuit.

In testimony whereof, I have hereunto subscribed my name this 19th day of May, 1914.

RUDOLF E. HELLMUND.

Witnesses:
J. V. DOBSON,
B. B. HINES.